(12) United States Patent
Midorikawa et al.

(10) Patent No.: US 7,559,966 B2
(45) Date of Patent: Jul. 14, 2009

(54) EXHAUST GAS FILTER

(75) Inventors: Youhei Midorikawa, Tokyo (JP); Satoshi Miki, Yokohama (JP); Tetsuya Abe, Tokai-mura (JP); Takashi Arai, Naka (JP); Masahiro Nemoto, Tokai (JP); Seiji Hiroki, Kitaibaraki (JP)

(73) Assignee: Anest Iwata Corporation, Kanagawa (JP)

( * ) Notice: Subject to any disclaimer, the term of this patent is extended or adjusted under 35 U.S.C. 154(b) by 373 days.

(21) Appl. No.: 11/709,919

(22) Filed: Feb. 22, 2007

(65) Prior Publication Data

US 2007/0234692 A1 Oct. 11, 2007

(30) Foreign Application Priority Data

Feb. 24, 2006 (JP) .............................. 2006-048502

(51) Int. Cl.
*B01D 50/00* (2006.01)
*B01D 39/04* (2006.01)

(52) U.S. Cl. .............................. 55/485; 55/323; 55/486; 55/528; 55/DIG. 30

(58) Field of Classification Search .................. 55/320, 55/321, 322, 323, 482, 482.1, 485, 486, 487, 55/488, 489, 523, 527, 528, DIG. 30
See application file for complete search history.

(56) References Cited

U.S. PATENT DOCUMENTS

| 5,536,286 A | * | 7/1996 | Freeman ...................... 55/322 |
| 6,576,045 B2 | * | 6/2003 | Liu et al. ..................... 95/268 |
| 7,329,298 B1 | * | 2/2008 | Hasinski ..................... 55/385.3 |

FOREIGN PATENT DOCUMENTS

JP 11-210658 A 3/1999

* cited by examiner

*Primary Examiner*—Duane Smith
*Assistant Examiner*—Robert A Clemente
(74) *Attorney, Agent, or Firm*—David & Bujold, P.L.L.C.

(57) ABSTRACT

An exhaust gas filter comprises an outer tube, a plurality of center-closing filter units each having an isolation plate; and a plurality of center-opening filter units having an annular isolation plate, two kinds of filter units being arranged alternately in the outer tube. The isolation plate and annular isolation plate are enclosed by flammable fibers. When a contaminated gas goes through the flammable fibers, it can be filtrated.

11 Claims, 3 Drawing Sheets

EXHAUST GAS FILTER

This application claims priority from Japanese Application Serial No. 2006-48502 filed Feb. 24, 2006.

BACKGROUND OF THE INVENTION

The present invention relates to an exhaust gas filter and especially to an exhaust gas filter for removing solid ingredients such as worn-away powder contaminated by radioactivity.

In nuclear facilities such as nuclear power plants and accelerators, waste oil is produced during operation if an oil-supply rotary vacuum pump is used to obtain vacuum. So oilless dry vacuum pumps are widely used.

However, even in a dry vacuum pump, grease for lubricating a rotary portion is likely to deteriorate by radioactivity. JP11-210658A proposed a vacuum exhaust device that comprises a solid lubricating bearing for a rotary part.

But, even if the solid lubricating bearing is used, a vacuum pump will have air-tight tip seals at the end of the rotary part. With operation, the tip seals are worn away and released in air. To prevent it, a filter is provided in an exhaust tube or other tubes to filtrate a gas and to catch fine powder contained in an exhaust gas.

However, workers are likely to be exposed to radioactivity in the exhaust gas when the filter is repaired or replaced. It is required to provide effective means for removing fine powder contaminated by radioactivity in the exhaust gas discharged from the dry vacuum pump.

SUMMARY OF THE INVENTION

In view of the disadvantages, it is an object of the invention to provide an exhaust gas filter that enables fine powder to be removed effectively from an exhaust gas discharged from a dry vacuum pump exposed to radioactivity so that a main part of the gas filter can be replaced and burnt without releasing a toxic gas to the environment.

BRIEF DESCRIPTION OF THE DRAWINGS

The features and advantages of the invention will become more apparent from the following description with respect to embodiments as shown in accompanying drawings wherein.

DETAILED DESCRIPTION OF THE DRAWINGS

Figure 1:
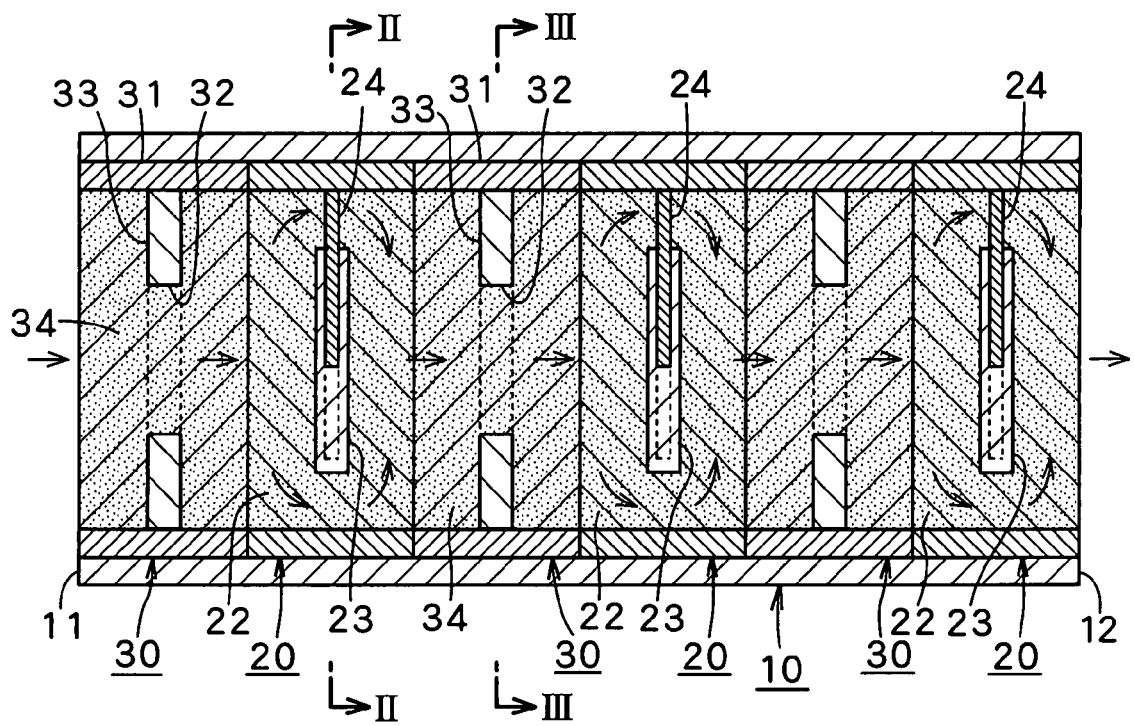
FIG. 1 is a vertical sectional side view of an embodiment of an exhaust gas filter according to the present invention.

In FIG. 1, an outer tube 10 is made of nonflammable or flammable material. An entrance 11 is connected to a discharge portion of a vacuum pump (not shown) and an exit 12 is open to air.

Figure 2:
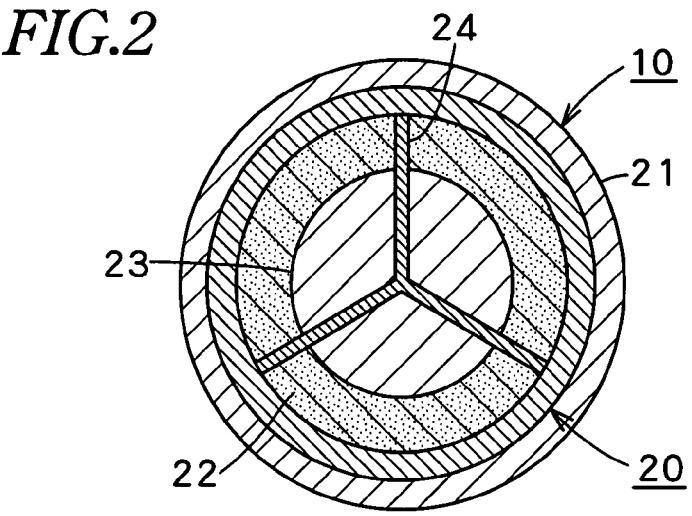
FIG. 2 is a vertical sectional front view taken along the line II-II in FIG. 1 to show a center-closing filter unit.

In FIG. 2, a center-closing filter unit 20 comprises a short holding tube 21 made of flammable gas-impermeable material such as paper in which a flammable gas-impermeable smaller-diameter isolation plate 23 is enclosed by flammable fibers 22 such as sisal fibers which do not generate toxic gases in combustion.

The isolation plate 23 is supported by a plurality of flammable support rod 24 fixed in the holding tube 21 without adhesive.

Figure 3:
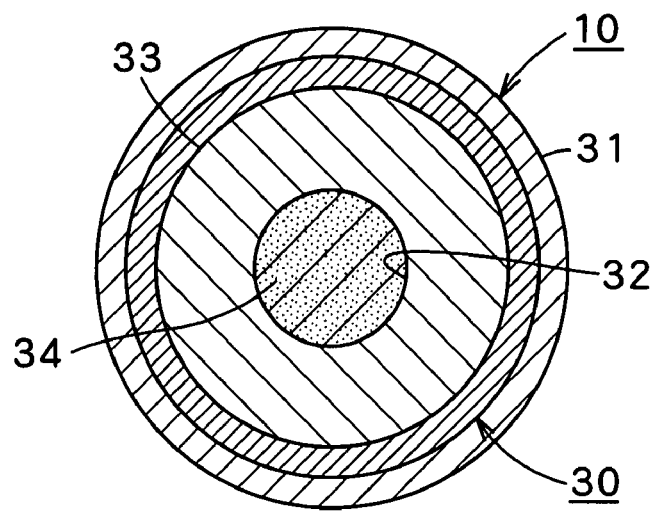
FIG. 3 is a vertical sectional front view taken along the line III-III in FIG. 2 to show a center-open filter unit.

As shown in FIG. 3, a center-opening filter unit 30 is made of flammable gas-impermeable material in a short holding tube 31 made of flammable gas-impermeable material such as paper. An annular isolation plate 33 has an opening 32 having a diameter slightly smaller than an external diameter of the isolation plate 23. Flammable fibers 34 such as sisal fibers which do not generate a toxic gas in combustion are disposed in around the opening 32.

Figure 4:
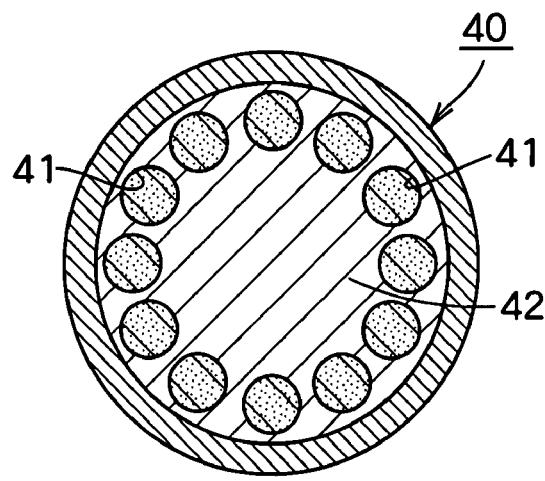
FIG. 4 is a front view of another embodiment of an isolation plate.

FIG. 4 shows a closing plate 40 in which a plurality of through-holes 41 are formed on the circumference to constitute a smaller-diameter isolation plate 42.

Figure 5:
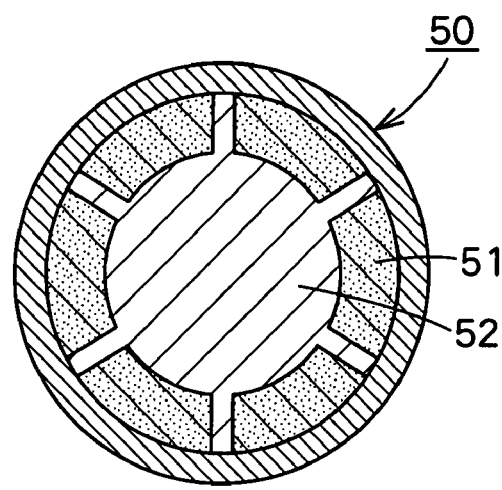
FIG. 5 is a front view of further embodiment of the isolation plate.

FIG. 5 shows a closing plate 50 in which a plurality of notches 51 are formed from the outer circumference to constitute a smaller-diameter isolation plate 52.

Figure 6:
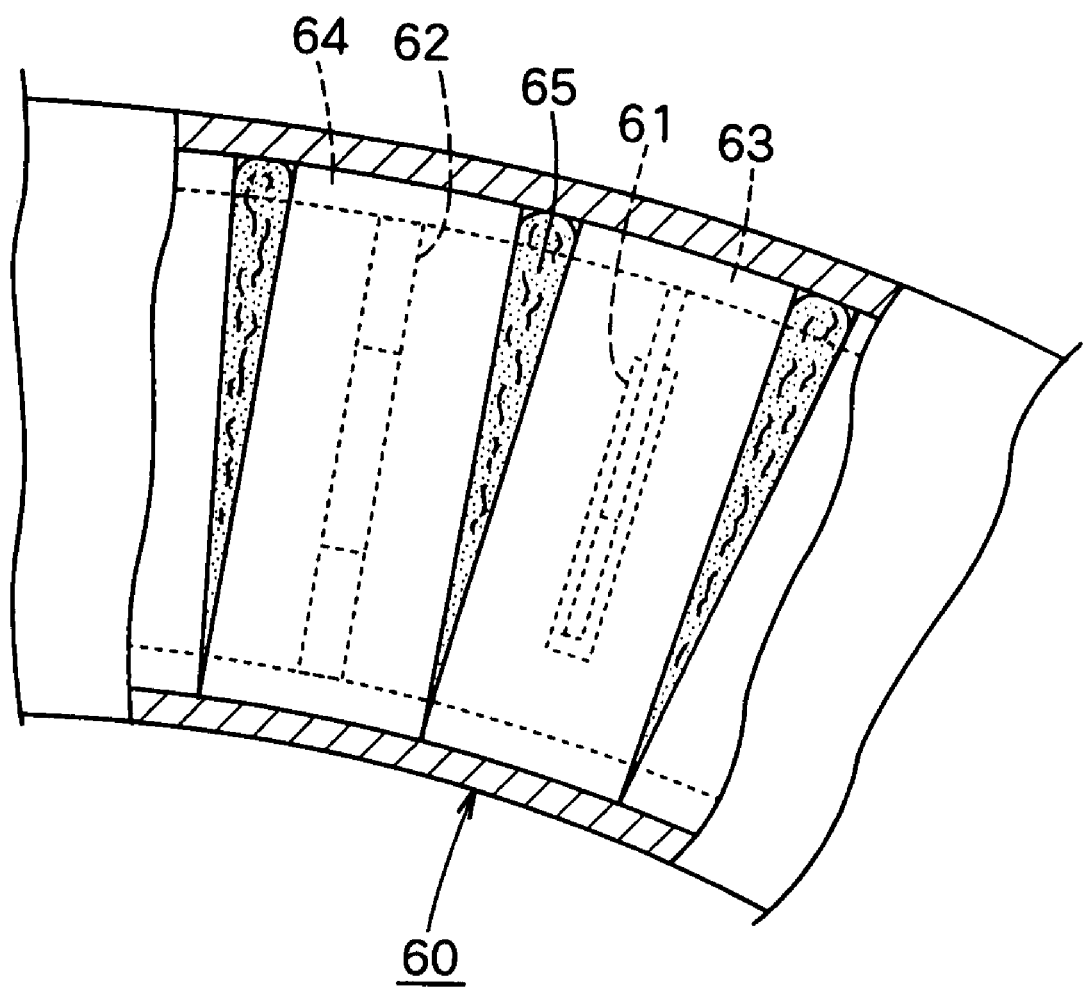
FIG. 6 is a vertical sectional side view of another embodiment of a filter.

FIG. 6 is a vertical sectional side view of further embodiment of the present invention. Flammable fibers 65 project from the end faces of holding tubes 63,64 of a center-closing filter unit 61 and a center-open filter unit 62 which are arranged in a curved outer tube 60.

The foregoing merely relate to embodiments of the invention. Various changes and modifications may be made by a person skilled in the art without departing from the scope of claims wherein:

What is claimed is:

1. An exhaust gas filter comprising:
   an outer tube having an entrance connected to an exhaust-gas-generating portion and an exit that opens to air;
   a plurality of center-closing filter units each comprising a first short holding tube, a flammable gas-impermeable smaller-diameter isolation plate in the first holding tube, and first flammable fibers that surround the isolation plate and do not generate a toxic gas in combustion in the holding tube; and
   a plurality of center-opening filter units each comprising a second short holding tube, a flammable gas-impermeable annular isolation plate in the second holding tube and second flammable fibers that surround the annular isolation plate and do not generate a toxic gas in combustion in the holding tube, said plurality of center-closing filter units and said plurality of center-opening filter units being alternately arranged in the outer tube.

2. An exhaust gas filter of claim 1 wherein the outer tube is made of nonflammable material.

3. An exhaust gas filter of claim 1 wherein the outer tube is made of flammable material.

4. An exhaust gas filter of claim 1 wherein the first and second holding tubes are made of flammable material.

5. An exhaust gas filter of claim 1 wherein the first and second holding tubes are made of nonflammable material.

6. An exhaust gas filter of claim 1 wherein the isolation plate of the center-closing filter unit is larger in diameter than an opening of the annular isolation plate of the center-opening filter unit.

7. An exhaust gas filter of claim 1 wherein the isolation plate of the center-closing filter unit is supported by a plurality of flammable support rods connected at a center in the holding tube.

8. An exhaust gas filter of claim 1 wherein a plurality of through-holes are formed circumferentially close to the holding tube in the isolation plate of the center-closing filter unit.

9. An exhaust gas filter of claim 1 wherein a plurality of notches are formed from an outer circumference of the isolation plate of the center-closing filter unit.

10. An exhaust gas filter of claim 1 wherein the first and second flammable fibers comprise sisal fibers.

11. An exhaust gas filter of claim 1 wherein a gap between adjacent holding tubes are embedded by the flammable fibers when the holding tubes are arranged in a curved position.

* * * * *